(12) United States Patent
Hou

(10) Patent No.: US 6,516,415 B1
(45) Date of Patent: Feb. 4, 2003

(54) DEVICE AND METHOD OF MAINTAINING A SECRET CODE WITHIN AN INTEGRATED CIRCUIT PACKAGE

(75) Inventor: Chien-Tzu Hou, Fremont, CA (US)

(73) Assignee: Geneticware Co., LTD, Tortola (VG)

( * ) Notice: Subject to any disclaimer, the term of this patent is extended or adjusted under 35 U.S.C. 154(b) by 0 days.

(21) Appl. No.: 09/298,355

(22) Filed: Apr. 23, 1999

(51) Int. Cl.[7] .............................. H04L 9/32; H04L 9/28; H04L 9/00
(52) U.S. Cl. .................. 713/194; 713/193; 380/28; 380/278
(58) Field of Search ................................ 713/193–194; 380/28, 44, 278

(56) References Cited

U.S. PATENT DOCUMENTS

| 4,965,828 A | * | 10/1990 | Ergott, Jr. et al. | .......... 713/193 |
| 5,065,429 A | * | 11/1991 | Lang | ........................... 705/56 |
| 5,237,611 A | * | 8/1993 | Rasmussen et al. | ........ 380/284 |
| 5,694,469 A | * | 12/1997 | Le Rue | ........................ 705/51 |
| 5,828,753 A | * | 10/1998 | Davis | .......................... 713/189 |
| 6,163,612 A | * | 12/2000 | Takeda et al. | ............... 380/285 |
| 6,272,637 B1 | * | 8/2001 | Little et al. | .................. 713/194 |
| 6,378,072 B1 | * | 4/2002 | Collins et al. | ............... 713/187 |

* cited by examiner

*Primary Examiner*—Gilberto Barron
*Assistant Examiner*—Kambiz Zand
(74) *Attorney, Agent, or Firm*—Townsend and Townsend and Crew LLP

(57) ABSTRACT

A device and method for safely maintaining a secret code within an integrated circuit (IC) package. The complete secret code is divided into two parts. The first part of the secret code is stored in a non-volatile memory device, such as flash memories, and provided by an internal random number generator. The second part of the secret code is stored in a volatile memory device, such as registers, and provided by external visa data issued from an authority center. Such a configuration can guarantee that no one can ferret out the complete secret code by opening the sealed IC package. Accordingly, the secret code can be safely and confidentially maintained within the IC package.

14 Claims, 4 Drawing Sheets

DEVICE AND METHOD OF MAINTAINING A SECRET CODE WITHIN AN INTEGRATED CIRCUIT PACKAGE

BACKGROUND OF THE INVENTION

1. Field of the Invention

The present invention relates in general to a security technology, more specifically, to a device and a method of maintaining a secret code within an integrated circuit (IC) package. The secret code is fragmented into several smaller pieces. These pieces are maintained in different storage media, which prevent anyone from acquiring complete information of the secret code.

2. Description of the Related Art

In modern cryptosystems, data that require high security are encrypted by specific encryption algorithms and corresponding keys and the encrypted data are deciphered by corresponding decryption algorithms and keys. In the security theory, it assumes that encryption/decryption algorithms are open to the public but decryption keys are kept by users. In other words, a good cryptosystem must guarantee that no one can accurately decipher the encrypted data within a reasonable period, even if the discipline of encryption/decryption algorithms and other useful information, such as some plaintext-ciphertext pairs, are well known.

FIG. 1 (Prior Art) illustrates a schematic diagram of a conventional asymmetric cryptosystem, or called the public-key cryptosystem, that uses different keys for encryption and decryption. The most popular public-key cryptosystem is RSA, which stands for Rivest, Shamir, Adleman, the inventors of the RSA system. As shown in FIG. 1, the illustrated communication session includes communication station A and communication station B. Communication stations A and B contain encryption/decryption software packages $1a$ and $1b$, respectively. In addition, a pair of public/private keys are dedicated to each of the communication stations. The public key and the private key of communication station A are called $PCK_A$ and $PRK_A$, respectively. The public key and the private key of communication station B are called $PCK_B$ and $PRK_B$, respectively. It is noticed that public keys are used for encryption and known by the public; private keys are confidential and used for decryption.

When communication station A attempts to transmit a document to communication station B, software package $1a$ first encrypts this document by using public key $PCK_B$ of communication station B, and transmits the encrypted document to communication station B. After receiving the encrypted document, communication station B activates software package $1b$ to decipher the encrypted document by using its private key $PRK_B$, thereby acquiring the original document. On the contrary, when communication station B attempts to transmit a document to communication station A, software package $1b$ encrypts this document by using public key $PCK_A$ of communication station A, and transmits the encrypted document to communication station A. After receiving the encrypted document, communication station A can activate software package $1a$ to decrypt the encrypted document by using its private key $PRK_A$, thereby acquiring the original document. It is noticed that algorithms used in software packages $1a$ and $1b$ and public keys $PCK_A$ and $PCK_B$ are open resources and known by the public. Accordingly, a cryptosystem must guarantee that it is almost impossible to draw the hidden information out of an encrypted document according to these open resources. In other words, if the corresponding private key is safe, the security level of such a cryptosystem could be maintained.

According to the above description, it appears that a poor maintenance of the private key (or the decryption keys in other systems) might be a weakness in security systems. A safe but inefficient approach to maintain the private key is to keep in mind. Users can retype the memorized private key while decrypting an encrypted data. However, it has become almost impossible to memorize these private keys correctly since they are getting longer and longer in modern cryptosystems. Accordingly, some visible forms, such as files or printed matters, are required to maintain these kinds of secret information. Therefore, there is a way to leak information due to the intrinsic features of these storage forms, such as portability and reproducibility.

In addition to being recorded in the files or printed matters, key information can also be mounted in a hardware module, which can be further mounted in the computer or data-processing machine. FIG. 2 (Prior Art) illustrates an example of such hardware module containing the key information. As shown in FIG. 2, hardware module 3, which includes key generator $3a$ and non-volatile memory $3b$, provides a decryption key for cipher 4 to decipher ciphertext $5b$ into plaintext $5a$. Key generator $3a$ is used to generate a pair of public/private keys, where the public key is released to the public and the private key is sent to non-volatile memory $3b$. Non-volatile memory $3b$ maintains the private key in secret, either permanently or for a considerable lasting period. Placing key generator $3a$ within hardware module 3 can keep the private key in secret during private key transmission. Furthermore, cipher 4 can be merged into the hardware module 3 to increase the security level of the private key.

However, it is still possible to steal the private key from hardware module 3 even if key generator $3a$ and cipher 4 are completely merged into hardware module 3 and the private key is not revealed during any processing steps. The hardware module is usually sealed by an IC package. For example, an intended intruder can take a brute attack to the IC package, which means to open the sealed IC package, thereby accessing the non-volatile memory component and thus ferreting out the private key. Strictly speaking, such a situation is not regarded as a security hole in security systems. However, it is also true that the security wall of such systems is fragile by this attack.

SUMMARY OF THE INVENTION

Therefore, the objective of the present invention is to provide a method and a system that maintain a secret code within an integrated circuit package. Such a package can prevent an outside brute attack and can keep necessary key information in secret safely.

The present invention achieves the above objective by providing a device for maintaining a secret code, which is enclosed in an integrated circuit package and is connected to an external power supply located at the outside of the integrated circuit device. The device embracing the secret code comprises a non-volatile memory for holding the first part of the secret code, a volatile memory that is powered by an external power supply and used for dynamically holding the second part of the secret code, and a coding component that is coupled to the non-volatile memory and the volatile memory and used for transforming a first text fed into the integrated circuit package into a second text by using both the first and the second part of the secret code. For example, the non-volatile memory can be a flash memory; the volatile memory can be a register powered by the external power supply. Since the second part of the secret code is stored in the volatile memory and powered by the external power supply, it will disappear when disconnecting the external power supply. Accordingly, the complete secret code cannot be acquired by brute attacking.

In addition, the device for maintaining the secret code can comprise a secret code generator, a non-volatile memory, a code processor and a volatile memory. The non-volatile memory and the volatile memory have the same characteristics as those in the last case. In addition, the secret code generator is used for producing the first part of the secret code; the code processor is used for generating the second part of the secret code according to external visa data received from the outside of the integrated circuit package. Moreover, the device embracing the secret code can further comprise a coding component for encoding and decoding from one document to another document, by using both the first and the second part of secret code. The secret code generator can be a random number generator. The code processor can be remotely connected to an authority unit. In this case, the code processor comprises a first storage component for storing request data ready to be sent to the authority unit, a second storage component for storing the external visa data received from the authority unit, and a calculator for computing a first mathematical function of the request data and the external visa data to reproduce the second part of the secret code. Meanwhile, the authority unit comprises a third storage component for storing the request data received from the code processor, a fourth storage component for storing the second part of the secret code, and a calculator for computing a second mathematical function of the request data and the second part of the secret code to generate the external visa data. It is noted that the first mathematical function is the inverse of the second mathematical function.

In addition, the method for establishing a secret code in an integrated circuit package comprises the following steps. The first step is to produce a first part of the secret code within the integrated circuit package. Then the first part of the secret code is stored in the non-volatile memory located within the integrated circuit package. The next step is to generate a second part of the secret code according to external visa data supplied by the outside of the integrated circuit package, namely, the authority unit. Then the second part of the secret code is stored in a volatile memory that is located within the integrated circuit package and powered by an external power supply. Finally, the secret code including the first part and the second part of the secret code can be used as the complete secret code in the practical encoding/decoding scheme. The external visa data are acquired by the following steps. First, request data are sent from the integrated circuit package to the authority unit. The authority unit computes a first mathematical function of the request data and the second part of the secret code to generate the external visa data. Then the resulted external visa data are sent from the authority unit to the integrated circuit package. Finally, the external visa data together with the request data are operated on a second mathematical function that is the inverse of the first mathematical function. The second part of the secret code is acquired.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE PREFERRED EMBODIMENTS

To begin with the preferred embodiment, the insides of the present invention are briefly described as follows. As stated above, safely and confidentially maintaining private keys is a critical issue in modern cryptosystems. In the following discussion, the key-related information requiring being hidden is called the secret code. In the present invention, the secret code is fragmented into several smaller parts and stored in hardware sealed in an IC package. These smaller parts can be maintained in different manners, more specifically, in different kinds of storage devices, which can complicate the overall storage configuration and prevent from retrieving the complete secret code by brute attacking. In addition, these smaller pieces can be provided by various schemes, which can diversify the secret code sources and enable a lot of applications.

Figure 1:
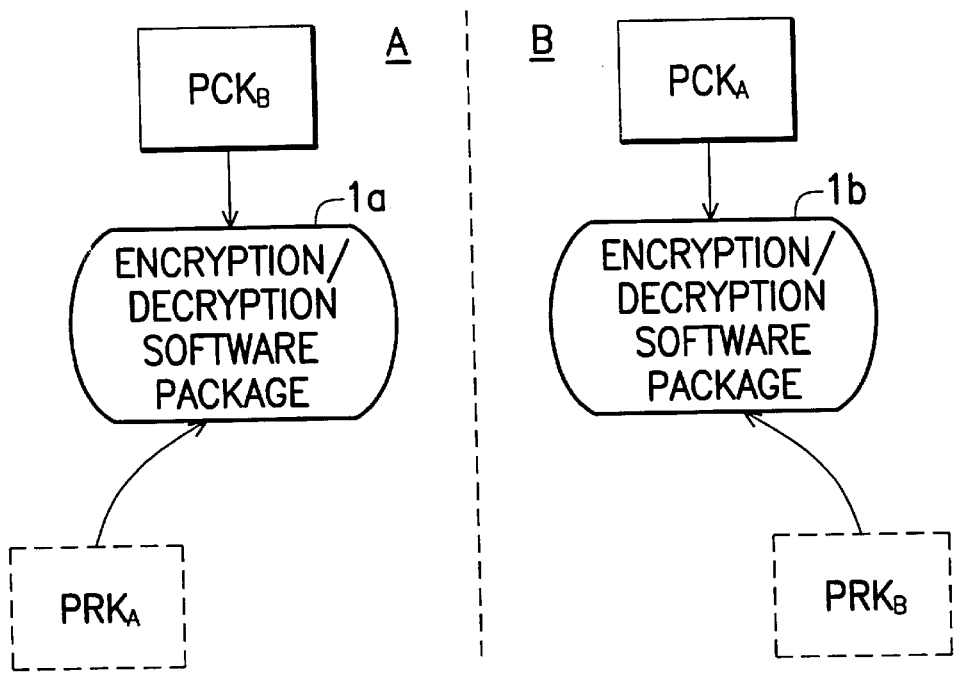
FIG. 1 (Prior Art) is a schematic diagram for illustrating the key arrangement of the conventional symmetric-key cryptosystem.
Figure 2:
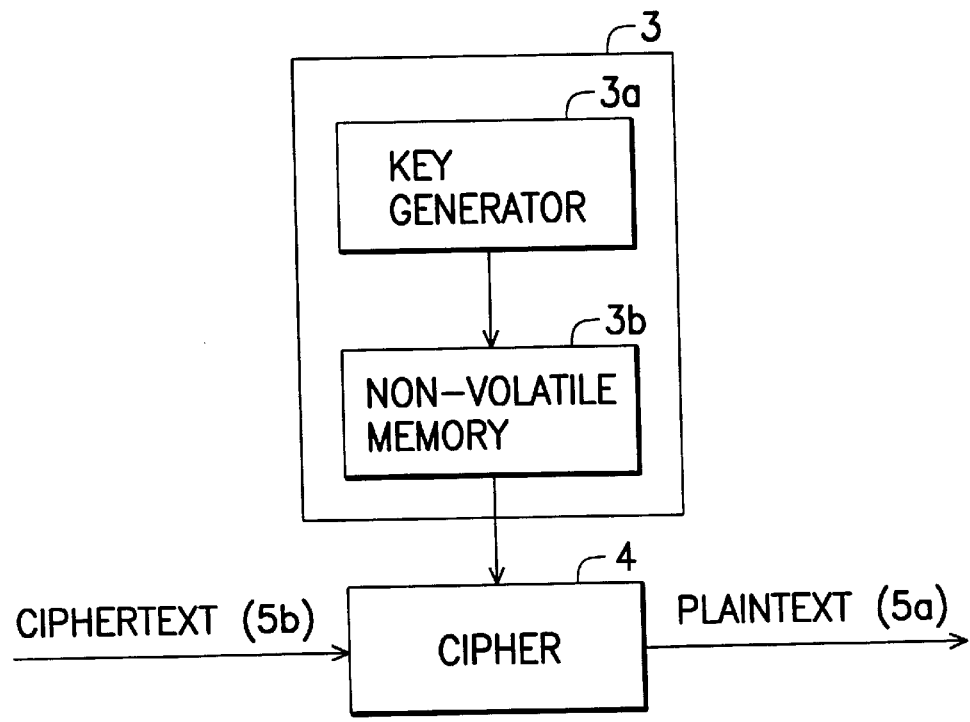
FIG. 2 (Prior Art) shows a block diagram of an embodiment of a conventional security system using a hardware module as a key holder.
Figure 3:
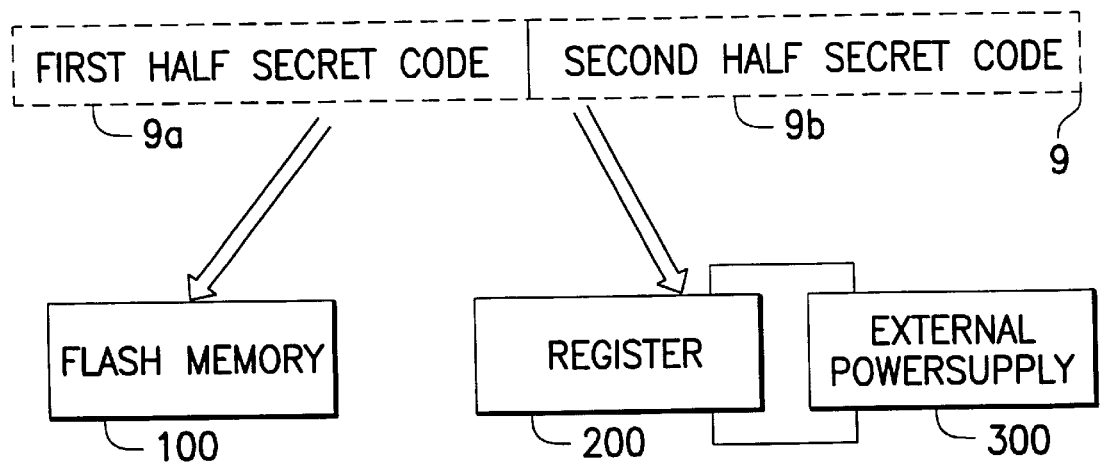
FIG. 3 is a diagram showing the details of the secret code and their corresponding storage components in accordance with the embodiment of the present invention.

FIG. 3 is a diagram showing the secret code and its corresponding storage media in accordance with the embodiment. As shown in FIG. 3, secret code 9 is partitioned into two parts, namely, first half secret code 9a and second half secret code 9b. For example, assume that complete secret code 9 contains 128 bits. Therefore, bit lengths of first half secret code 9a and second half secret code 9b can be equal and both contain 64 bits. It is noticed that the number of parts of the secret code and their corresponding bit lengths are not limited in the condition specified in this embodiment and can vary depending on various practical situations.

FIG. 3 also illustrates the corresponding storage media for storing the two parts of secret code 9. Flash memory 100 is used to store first half secret code 9a and register 200 is used to store second half secret code 9b. In reality, flash memory 100 can be replaced by other non-volatile memory devices, such as EEPROMs (electrical erasable programmable read only memories). In addition, multi-bit register 200 can be replaced by other volatile memory devices, such as DRAMs (dynamic random access memories). It is also noticed that register 200 is powered by external power supply 300, which makes flash memory 100 and register 200 different in the storage feature.

In this embodiment, flash memory 100 and register 200 are sealed in an IC package and used for carrying complete secret code 9. External power supply 300 is located at the outside of the IC package. It is known that flash memory 100 or other non-volatile memory devices can hold its inside data for a long period even without power, but register 200 or other volatile memory devices will lose its inside data while the power is shut down. As one attempts to open the IC package containing these storage media, the power supplied to the IC package must be shut down first. Accordingly, first half secret code 9a stored in flash memory 100 could be retrieved by brute attacking but second half secret code 9b would disappear when the power is shut down.

Figure 4:
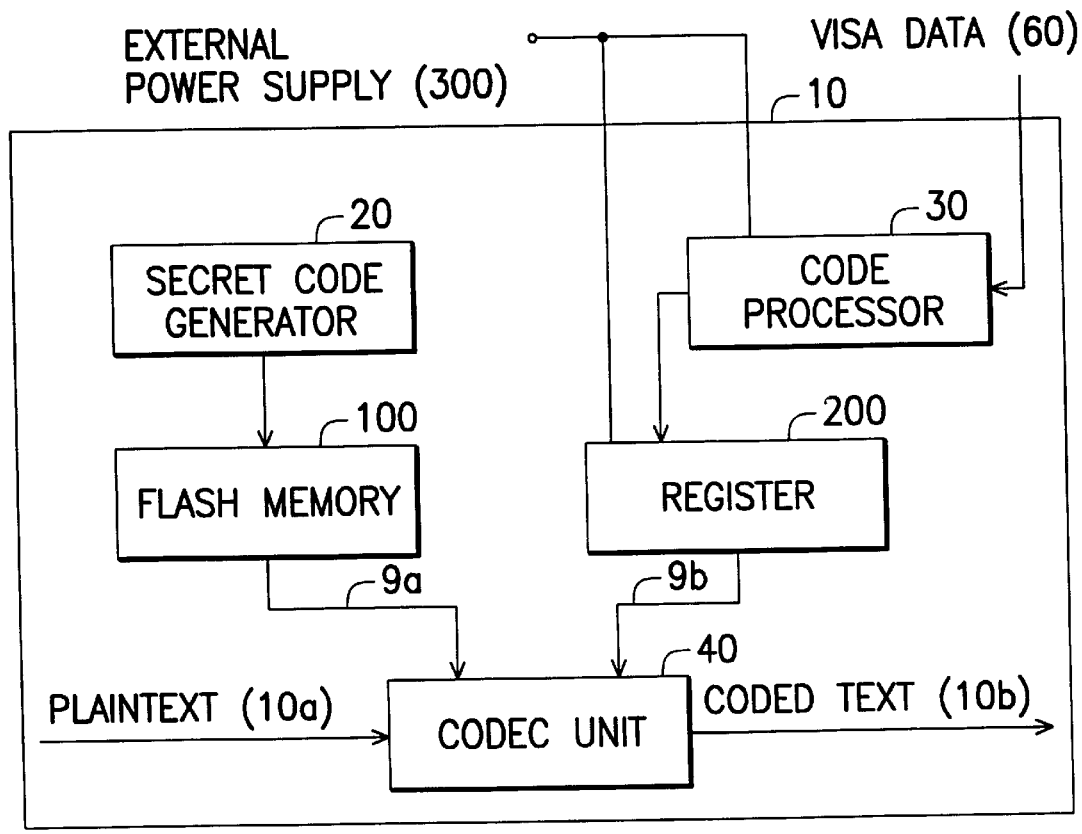
FIG. 4 is a block diagram of the hardware module in accordance with the embodiment of the present invention.

FIG. 4 is a full block diagram of a hardware module containing the above-described storage devices in accordance with this embodiment. As described above, hardware module 10 is sealed in an IC package (not shown). In addition to flash memory 100 and register 200, hardware module 10 further comprises secret code generator 20 coupled to flash memory 100, code processor 30 coupled to register 200 and codec (encoder/decoder) unit 40 coupled to the two storage devices. Secret code generator 20 is used to generate first half secret code 9a and to store it in flash memory 100. In this embodiment, secret code generator 20 is a random number generator, which can secretly give first half secret code 9a and leak no related information to the outside. First half secret code 9a generated inside hardware module 10 can be transmitted to another communication station that is ready to communicate in a specific manner. Code processor 30 is used to produce second half secret code 9b according to visa data 60 supplied from the outside and to store it in register 200. In this embodiment, code processor 30 is also supplied by external power supply 300, which has the same effect as register 200 is. That is, data temporarily maintained in code processor 30 would disappear when the power is disconnected. The function of code processor 30 and the meaning of visa data 60 will be discussed later.

As shown in FIG. 4, first half secret code 9a and second half secret code 9b are merged into complete secret code 9 and fed into codec unit 40. In this embodiment, codec unit 40 is also sealed within the same IC package for improving security level. Although FIG. 4 illustrates that secret code 9 is used to encode plaintext 10a into coded text 10b, it is understood by those skilled in the art that secret code 9 can also be applied to decryption. In addition, codec unit 40 can further include a transformer (not shown) for transforming secret code 9 into real encoding/decoding keys. It means that secret code 9 can be directly used as encoding/decoding keys or a key ancestor for generating the real encoding/decoding keys.

FIG. 4 has indicated the different generation schemes of first half secret code 9a and second half secret code 9b. First half secret code 9a is created inside hardware module 10, which means that first half secret code 9a cannot be reached by normal accessing. On the other hand, second half secret code 9b is generated according to external visa data 60. Accordingly, fragmentation of secret code 9 can diversify the sources and make it possible to fulfill various applications. For example, authentication can be achieved by using the external visa data 60, which will be discussed in the subsequent paragraph.

Figure 5:
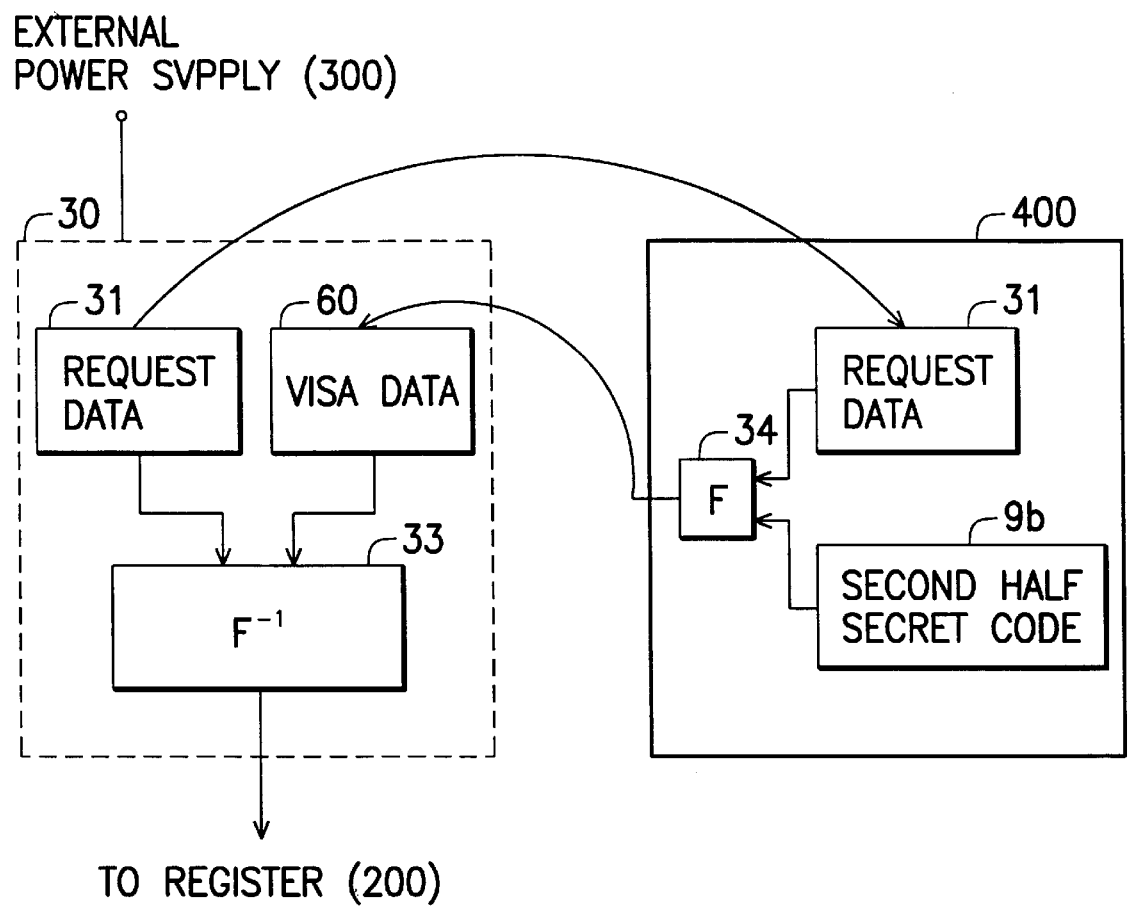
FIG. 5 is a block diagram showing the configuration of the code processor and the authority center in the embodiment.

FIG. 5 is a block diagram showing the configuration of code processor 30 and authority center 400 for demonstrating authentication function using external visa data 60. As shown in FIG. 5, code processor 30 includes a first memory device for storing request data 31, a second memory device for storing visa data 60 and a calculator 33 for performing a mathematical function $F^{-1}$. Code processor 30 is remotely connected to authority center 400, which includes a third memory device for storing request data 31 received from code processor 30, a fourth memory device for storing true second half secret code 9b and a calculator 34 for performing a mathematical function F. It is noticed that the mathematical function $F^{-1}$ is the inverse of the mathematical function F.

Request data 31 are generated, for example, by a random number generator like secret code generator 20 in hardware module 10. Then request data 31 are sent from code processor 30 to authority center 400. Visa data 60 can be obtained by performing mathematical function F of request data 31 and second half secret code 9b. Visa data 60 are then sent to code processor 30. Code processor 30 uses request data 31 and visa data 32 as inputs and thus performs the mathematical function $F^{-1}$ to reproduce second half secret code 9b. Accordingly, authority center 400 can use visa data 60 to control the validity of secret code 9. The scheme for invoking second half secret code 9b illustrated above is not intended to limit the scope of the present invention. It is understood by those skilled in the art that second half secret code 9b can be invoked by other more sophisticated schemes to improve the security level of the transmitted information.

Figure 6:
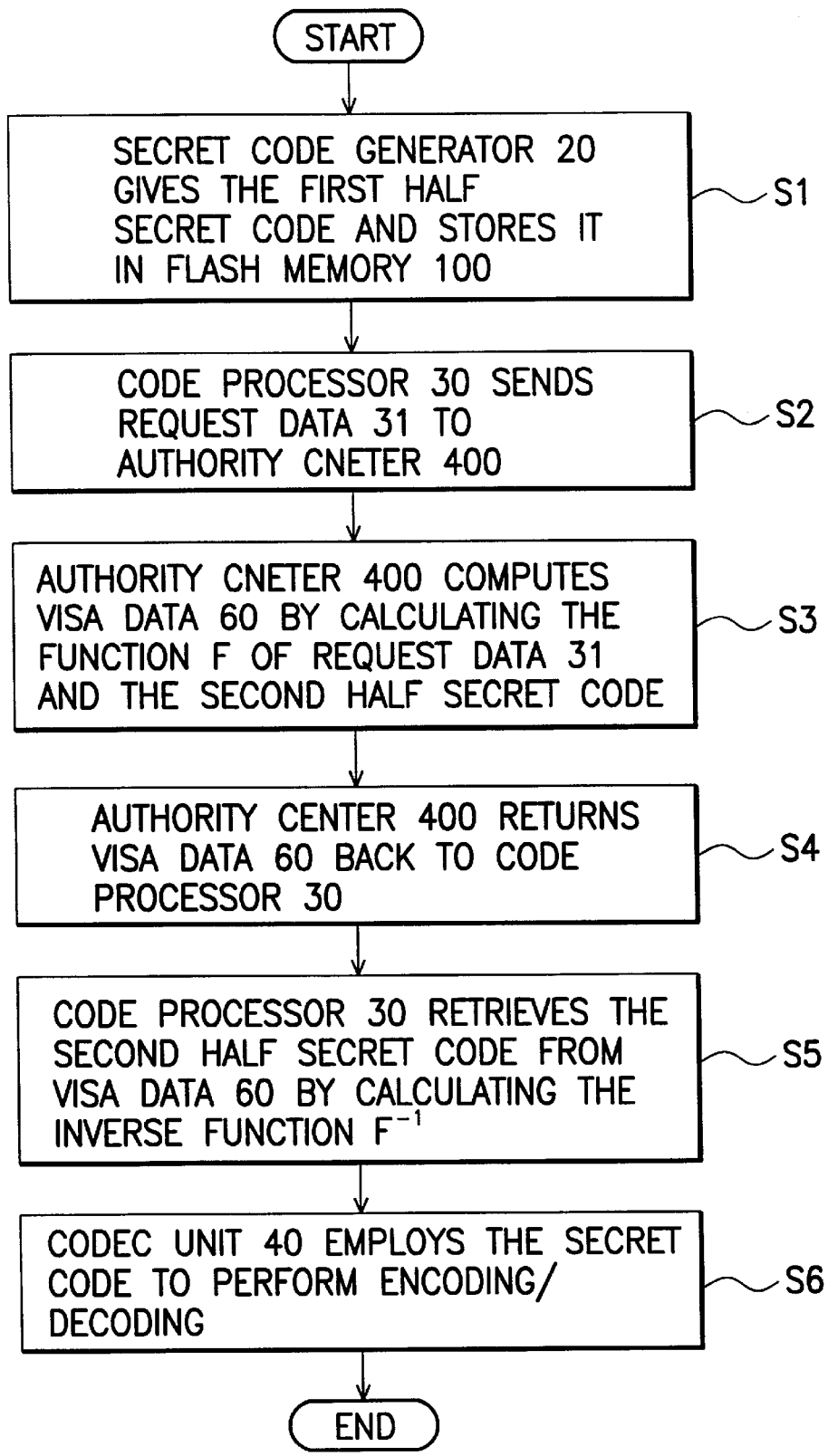
FIG. 6 is a flowchart showing the detailed steps of establishing a complete secret code within the hardware module in accordance with the embodiment of the present invention.

FIG. 6 is a flowchart showing the detailed steps of establishing a complete secret code within hardware module 10 in this embodiment. As illustrated in FIG. 6, secret code generator 20 gives first half secret code 9a and stores it in flash memory 100 (step S1). Next, second half secret code 9b can be derived from visa data 60 generated by authority center 40. First code processor 30 sends the request data 31 to authority center 400 (step S2). After receiving the request data 31, authority center 400 can compute visa data 60 by calculating the function F of request data 31 and second half secret code 9b (step S3). After acquiring the corresponding visa data, authority center 400 returns visa data 60 back to code processor 30 (step S4). Finally, code processor 30 can reproduce second half secret code 9b from visa data 32 by calculating the inverse function $F^{-1}$ (step S5). As first half secret code 9a and second half secret code 9b are stored in the flash memory 100 and in the register 200, respectively, codec unit 40 employs complete secret code 9 to perform encoding/decoding (step S6).

According to the above description, the features of this invention can be summarized as follows:

1. A complete secret code is divided into two parts, which are stored in a non-volatile memory device and in a volatile memory device, respectively. Since any data stored in the volatile memory device will disappear when its power supply is shut down, no one can ferret out the part of the secret code stored in the volatile memory device by opening the sealed IC package. Such a manner can effectively prevent from brute attacking and keep the security level of the secret code stored in a hardware module.

2. The two parts of the secret code can be provided by different sources, which diversifies the usage of the secret code and makes many applications feasible. In the embodiment, a part of the secret code is derived from external visa data provided by an authority center that can be trusted. Therefore, authentication can be achieved.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A device for maintaining a secret code, which is enclosed in an integrated circuit package and connected to an external power supply located at the outside of the integrated circuit package, comprising:

means, located within the integrated circuit package, for producing a first part of the secret code;

a non-volatile memory, coupled to the producing means, for holding the first part of the secret code;

means, located within the integrated circuit package, for generating a second part of the secret code according to external visa data received from the outside;

a volatile memory, coupled to the generating means and powered by the external power supply, for dynamically holding the second part of the secret code;

wherein the generating means is remotely connected to an external authority unit and comprises:
   first means for storing request data ready to be sent to the authority unit;
   second means for storing the external visa data received from the authority unit; and
   means, coupled to the first storing means and the second storing means, for computing a first mathematical function of the request data and the external visa data to reproduce the second part of the secret code;

and the authority unit comprises:
   third means for storing the request data received from the generating means of the device;
   fourth means for storing the second part of the secret code; and
   means, coupled to the third storing means and the fourth storing means, for computing a second mathematical function of the request data and the second part of the secret code to generate the external visa data, the first mathematical function being the inverse of the second mathematical function.

2. The device as recited in claim 1, further comprising:
means, coupled to the non-volatile memory and the volatile memory, for coding a first text into a second text by using the first part and the second part of the secret code.

3. The device as recited in claim 2, wherein the coding means is located within the integrated circuit package.

4. The device as recited in claim 1, wherein the producing means is a random number generator.

5. The device as recited in claim 1, wherein the non-volatile memory is a flash memory.

6. The device as recited in claim 1, wherein the volatile memory is a register powered by the external power supply for dynamically holding the second part of the secret code.

7. The device as recited in claim 1, wherein the first part of the secret code and the second part of the secret code form the complete secret code.

8. The device as recited in claim 1, wherein the generating means is powered by the external power supply.

9. A device as recited in claim 1, further comprising:
coding means, coupled to the non-volatile memory and the volatile memory, for transforming a first text fed into the integrated circuit package into a second text by using the first part of the secret code and the second part of the secret code.

10. A method of establishing a secret code in an integrated circuit package, comprising the steps of:
   producing a first part of the secret code within the integrated circuit package;
   storing the first part of the secret code in a non-volatile memory located within the integrated circuit package;
   generating a second part of the secret code according to external visa data supplied from the outside of the integrated circuit package;
   storing the second part of the secret code in a volatile memory which is located within the integrated circuit package and powered by an external power supply; and
   combining the first part and the second part of the secret code to be the complete secret code;
   wherein the step of generating the second part of the secret code further comprises the steps of:
      sending request data from the integrated circuit package to an authority unit located at the outside of the integrated circuit package;
      computing a first mathematical function of the request data and the second part of the secret code to generate the external visa data in the authority unit;
      sending the external visa data from the authority unit to the integrated circuit package; and
      computing a second mathematical function of the external visa data and the request data to reproduce the second part of the secret code, the second mathematical function being the inverse of the first mathematical function.

11. The method as recited in claim 10, further comprising a step of supplying the secret code to a codec device located within the integrated circuit package serving as a codec key.

12. The method as recited in claim 10, wherein the step of producing the first part of the secret code is performed by a random number generator.

13. The method as recited in claim 10, wherein the non-volatile member is a flash memory.

14. The method as recited in claim 10, wherein the volatile memory is a register powered by the external power supply for dynamically holding the second part of the secret code.

\* \* \* \* \*